US011975568B2

(12) United States Patent
McKay

(10) Patent No.: US 11,975,568 B2
(45) Date of Patent: May 7, 2024

(54) SELF-ADJUSTING CASTER ASSEMBLIES

(71) Applicant: Gatekeeper Systems, Inc., Foothill Ranch, CA (US)

(72) Inventor: John C. McKay, Placentia, CA (US)

(73) Assignee: Gatekeeper Systems, Inc., Foothill Ranch (CA)

( * ) Notice: Subject to any disclaimer, the term of this patent is extended or adjusted under 35 U.S.C. 154(b) by 0 days.

(21) Appl. No.: 17/156,328

(22) Filed: Jan. 22, 2021

(65) Prior Publication Data
US 2021/0229491 A1 Jul. 29, 2021

Related U.S. Application Data

(60) Provisional application No. 62/965,322, filed on Jan. 24, 2020.

(51) Int. Cl.
*B60B 33/04* (2006.01)
*B60B 33/00* (2006.01)

(52) U.S. Cl.
CPC ........ *B60B 33/045* (2013.01); *B60B 33/0076* (2013.01)

(58) Field of Classification Search
CPC . B60B 33/0076; B60B 33/0068; B60B 33/04; B60B 33/045; B60B 33/066
See application file for complete search history.

(56) References Cited

U.S. PATENT DOCUMENTS

| 750,984 A | * | 2/1904 | Kennedy | B60B 33/045 16/44 |
|---|---|---|---|---|
| 1,408,714 A | | 3/1922 | Preston | |
| 1,686,301 A | | 10/1928 | Wagenhorst | |
| 1,797,195 A | | 3/1931 | Burdette | |
| 2,083,766 A | | 6/1937 | Wittkopp | |
| 2,584,073 A | | 1/1952 | Williams | |
| 2,707,795 A | * | 5/1955 | Skupas | B60B 33/045 16/44 |
| 2,738,542 A | * | 3/1956 | Clark, Jr. | B60B 33/045 16/44 |
| 2,775,313 A | * | 12/1956 | Kurvers | B60T 1/04 188/2 R |
| 2,915,776 A | * | 12/1959 | Hanson | B60B 33/045 16/44 |

(Continued)

FOREIGN PATENT DOCUMENTS

| CN | 201520161 U | 7/2010 |
|---|---|---|
| EP | 0698404 A2 | 2/1996 |

(Continued)

*Primary Examiner* — Emily M Morgan
(74) *Attorney, Agent, or Firm* — Knobbe, Martens, Olson & Bear, LLP

(57) ABSTRACT

A self-leveling caster assembly includes a caster frame and a castor fork which is configured to pivot relative to the caster frame. A spring or other biasing mechanism biases the caster fork away from the caster frame, to maintain contact between the ground and a wheel supported by the caster fork along a travel range of the wheel. Even if a frame supporting the self-leveling caster assembly is bent, pulling the wheel away from the ground, the biased caster fork will maintain contact between the ground and the wheel, allowing continued use of a shopping cart or other wheeled apparatus including the self-leveling caster assembly.

14 Claims, 17 Drawing Sheets

(56) References Cited

U.S. PATENT DOCUMENTS

| | | | |
|---|---|---|---|
| 2,942,290 A * | 6/1960 | Segal | B60B 33/021 16/35 R |
| 3,228,089 A | 1/1966 | Turner | |
| 3,567,287 A | 3/1971 | Nutter | |
| 4,000,912 A * | 1/1977 | Donald | B60B 33/045 280/86.1 |
| 4,114,952 A | 9/1978 | Kimmell | |
| 4,372,569 A * | 2/1983 | Otterson | B62D 63/067 280/78 |
| 4,485,521 A * | 12/1984 | Welsch | B60B 33/045 16/44 |
| 4,783,880 A | 11/1988 | Chapman et al. | |
| 4,923,252 A | 5/1990 | Plamper et al. | |
| 5,503,466 A | 4/1996 | Lew | |
| 5,831,530 A | 11/1998 | Lace et al. | |
| 5,871,286 A * | 2/1999 | Kern | F16C 13/006 301/105.1 |
| 5,873,145 A * | 2/1999 | Chou | B60B 33/045 301/125 |
| 6,286,572 B1 | 9/2001 | Chen | |
| 6,298,891 B1 | 10/2001 | Harris | |
| 6,362,728 B1 | 3/2002 | Lace et al. | |
| 6,467,519 B1 | 10/2002 | Owen | |
| 6,532,623 B1 * | 3/2003 | Watanabe | B60B 33/0049 16/35 D |
| 6,539,578 B1 * | 4/2003 | Guttmann | B60B 33/045 16/44 |
| 6,607,201 B2 * | 8/2003 | Marshburn | B60B 33/045 16/44 |
| 6,945,366 B2 | 9/2005 | Taba | |
| 7,159,632 B2 | 1/2007 | Fukui | |
| 7,316,252 B1 | 1/2008 | Heard | |
| 7,334,617 B2 | 2/2008 | Hill, III et al. | |
| 7,438,366 B2 | 10/2008 | Machamer et al. | |
| 7,658,247 B2 | 2/2010 | Carter | |
| 7,878,600 B2 | 2/2011 | Krantz | |
| 7,944,368 B2 | 5/2011 | Carter et al. | |
| 8,046,160 B2 | 10/2011 | Carter et al. | |
| 8,292,018 B2 | 10/2012 | Huang | |
| 8,463,540 B2 | 6/2013 | Hannah et al. | |
| 8,464,843 B2 | 6/2013 | Qiu et al. | |
| 8,499,414 B1 * | 8/2013 | Lemeur, Jr. | B60B 33/0023 16/44 |
| 8,578,984 B2 | 11/2013 | Hannah et al. | |
| 8,607,414 B1 * | 12/2013 | Kinsela | B60B 33/045 16/44 |
| 8,674,845 B2 | 3/2014 | Carter et al. | |
| 8,714,220 B2 | 5/2014 | Tso et al. | |
| 8,751,148 B2 | 6/2014 | Carter et al. | |
| 8,820,447 B2 | 9/2014 | Carter et al. | |
| 8,894,086 B2 | 11/2014 | Ekbote | |
| 8,973,716 B2 | 3/2015 | McKay et al. | |
| 9,205,702 B2 | 12/2015 | Hannah et al. | |
| 9,358,835 B2 | 6/2016 | McKay | |
| 9,403,548 B2 | 8/2016 | Hannah et al. | |
| 9,630,639 B2 | 4/2017 | Carter et al. | |
| 9,669,659 B2 | 6/2017 | McKay et al. | |
| 10,155,415 B1 * | 12/2018 | Lu | B60B 33/045 |
| 10,730,349 B2 | 8/2020 | Bateman, Jr. et al. | |
| 2002/0190492 A1 * | 12/2002 | Strong | B60G 3/14 280/124.128 |
| 2004/0111830 A1 * | 6/2004 | Cooper | B60B 33/045 16/44 |
| 2005/0257871 A1 | 11/2005 | Hill et al. | |
| 2006/0117524 A1 * | 6/2006 | Yan | B60B 33/045 16/44 |
| 2007/0143957 A1 * | 6/2007 | Baek | B60B 33/045 16/44 |
| 2008/0143070 A1 | 6/2008 | Sonnendorfer et al. | |
| 2008/0179940 A1 | 7/2008 | Hill et al. | |
| 2008/0238016 A1 * | 10/2008 | Chen | B60B 33/045 280/124.145 |
| 2008/0303337 A1 | 12/2008 | Krantz | |
| 2010/0052412 A1 | 3/2010 | Morris | |
| 2011/0192515 A1 | 8/2011 | Fiorentin et al. | |
| 2012/0048636 A1 | 3/2012 | Huang | |
| 2012/0193969 A1 | 8/2012 | Tso et al. | |
| 2012/0241531 A1 | 9/2012 | Werner | |
| 2012/0285595 A1 | 11/2012 | Su | |
| 2014/0062165 A1 | 3/2014 | Hannah et al. | |
| 2014/0109341 A1 * | 4/2014 | Plate | B60B 33/045 16/19 |
| 2015/0197266 A1 | 7/2015 | Carter et al. | |
| 2017/0050466 A1 | 2/2017 | McKay | |
| 2018/0110490 A1 * | 4/2018 | Nam | A61B 6/4405 |
| 2020/0047551 A1 | 2/2020 | McKay | |

FOREIGN PATENT DOCUMENTS

| | | | |
|---|---|---|---|
| GB | 1459998 | 12/1976 | |
| JP | 2010-132010 | 6/2010 | |
| KR | 20160109660 A * | 10/2016 | B65D 19/42 |
| WO | WO 2009/137422 A1 | 11/2009 | |
| WO | WO 2013/043916 | 3/2013 | |
| WO | WO 2014/137669 A1 | 9/2014 | |

* cited by examiner

SELF-ADJUSTING CASTER ASSEMBLIES

CROSS-REFERENCE

Any and all applications for which a foreign or domestic priority claim is identified in the Application Data Sheet as filed with the present application are hereby incorporated by reference under 37 CFR 1.57.

This application claims the benefit of U.S. Provisional Application No. 62/965,322, filed Jan. 24, 2020 and entitled SELF-ADJUSTING CASTER, the disclosure of which is incorporated by reference in its entirety.

BACKGROUND

Technical Field

The disclosed technology relates to caster assemblies, and in particular to self-adjusting caster assemblies.

Certain Related Art

Multi-wheeled apparatuses, such as shopping carts, trolleys, dollies or similar structures may include a rigid frame with multiple wheels attached at different points of the rigid frame, and configured to be simultaneously in contact with the ground. To provide these shopping carts with increased maneuverability, at least some of these wheels may be supported by a caster, which allows a wheel to rotate independent of the orientation of the frame as a whole.

If the frame of the multi-wheeled apparatus is damaged or bent, distorting the frame, at least one of the wheels may no longer be able to be in contact with the ground at the same time as the other wheels. This may render operation of the shopping cart unpleasant or difficult, and may result in the shopping cart being removed from use despite fairly minor damage to the frame. Regardless of the overall durability of the remainder of the shopping cart, a minor warping of the frame may render an otherwise durable shopping cart unsuitable for use.

SUMMARY

In a first broad aspect, a caster assembly is provided, including a caster frame, a thrust bearing including a lower race coupled to or integral with the frame, an upper race, and a bearing axle, the thrust bearing configured to allow rotation of the caster frame about a first axis of rotation aligned with the bearing axle, a caster fork pivotally coupled to the caster frame, and a biasing member extending between a first end in contact with the frame at a first contact point and a second end in contact with the caster fork at a second contact point such that rotation of the caster fork relative to the frame varies a distance between the first contact point of the frame and the second contact point of the caster fork.

The biasing member may include a spring. The spring may include a conical coiled spring tapering from a larger cross-sectional diameter at the second end to a smaller cross-sectional diameter at the first end. The caster fork may be configured to rotate around a second axis of rotation which is generally orthogonal to the first axis of rotation. The the second axis of rotation may not intersect the first axis of rotation.

The caster fork may be located between a first side of the frame and a second side of the frame. The caster fork may be pivotally coupled to the caster frame via a pin extending through an aperture in the caster fork and an aperture in the caster frame. The aperture in the caster fork may have a larger cross-sectional size than the aperture in the caster frame.

In a second broad aspect, a caster assembly is provided, including a caster fork including first and second caster fork arms extending from either side of a central fork portion, the first and second caster fork arms configured to support a wheel disposed therebetween, a caster frame, the caster frame including a central frame portion and first and second frame wing portions extending from either side of the central frame portion, the caster fork attached to the caster frame and pivotable about an axis of rotation relative to the caster frame, the first and second frame wing portions located laterally outward of the caster fork arms, and a biasing member located between the central frame portion and the central fork portion and configured to bias the central fork portion away from the central frame portion.

The biasing member may include a conical coil spring attached at a first end to the central fork portion and at a second end to the central frame portion. The central fork portion may be substantially planar, and the first and second fork arms may extend generally parallel to one another in a direction generally orthogonal to the plane of the central fork portion.

The caster frame may be coupled to a thrust bearing, and the caster frame may be rotatable about a bearing axle of the thrust bearing. An axis of rotation of the thrust bearing is substantially perpendicular to the axis of rotation of the castor fork. The castor fork can be configured to support a wheel having an axis of rotation which remains radially offset from an axis of rotation of the thrust bearing.

The castor fork may include a plurality of mounting apertures configured to support a wheel assembly. A distance between a plane of the central frame portion and the mounting apertures in a direction normal to the plane of the central frame portion may increase with rotation of the central fork portion away from the central frame portion. The biasing member may be configured to push the castor fork away from the central frame portion to maintain contact between an underlying surface and a wheel supported by the castor fork.

In a third broad aspect, a wheeled apparatus is provided, including an apparatus frame, and a plurality of wheels supported by the apparatus frame, at least one of the wheels supported by a self-adjusting caster assembly disposed between the frame and the wheel, the self-adjusting caster assembly including a caster frame, a thrust bearing coupled to the caster frame and configured to allow rotation of the frame about a bearing axle coupled to the apparatus frame, a caster fork pivotally coupled to the caster frame, and a biasing member extending between a first end in contact with the caster frame at a first contact point and a second end in contact with the caster fork at a second contact point, rotation of the caster fork relative to the caster frame varying a distance between the first contact point of the frame and the second contact point of the caster fork.

The wheeled apparatus may further include a second self-adjusting caster assembly supporting a second wheel, the second self-adjusting caster assembly including a caster frame, a thrust bearing coupled to the caster frame and configured to allow rotation of the frame about a bearing axle coupled to the apparatus frame, a caster fork pivotally coupled to the caster frame, and a biasing member extending between a first end in contact with the frame at a first contact point and a second end in contact with the caster fork at a second contact point, rotation of the caster fork relative to the frame varying a distance between the first contact point of the frame and the second contact point of the caster fork. The wheeled apparatus may be a shopping cart.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. No feature, structure, or step disclosed in the drawings or description is essential or indispensable.

DETAILED DESCRIPTION OF CERTAIN EMBODIMENTS

Figure 1:
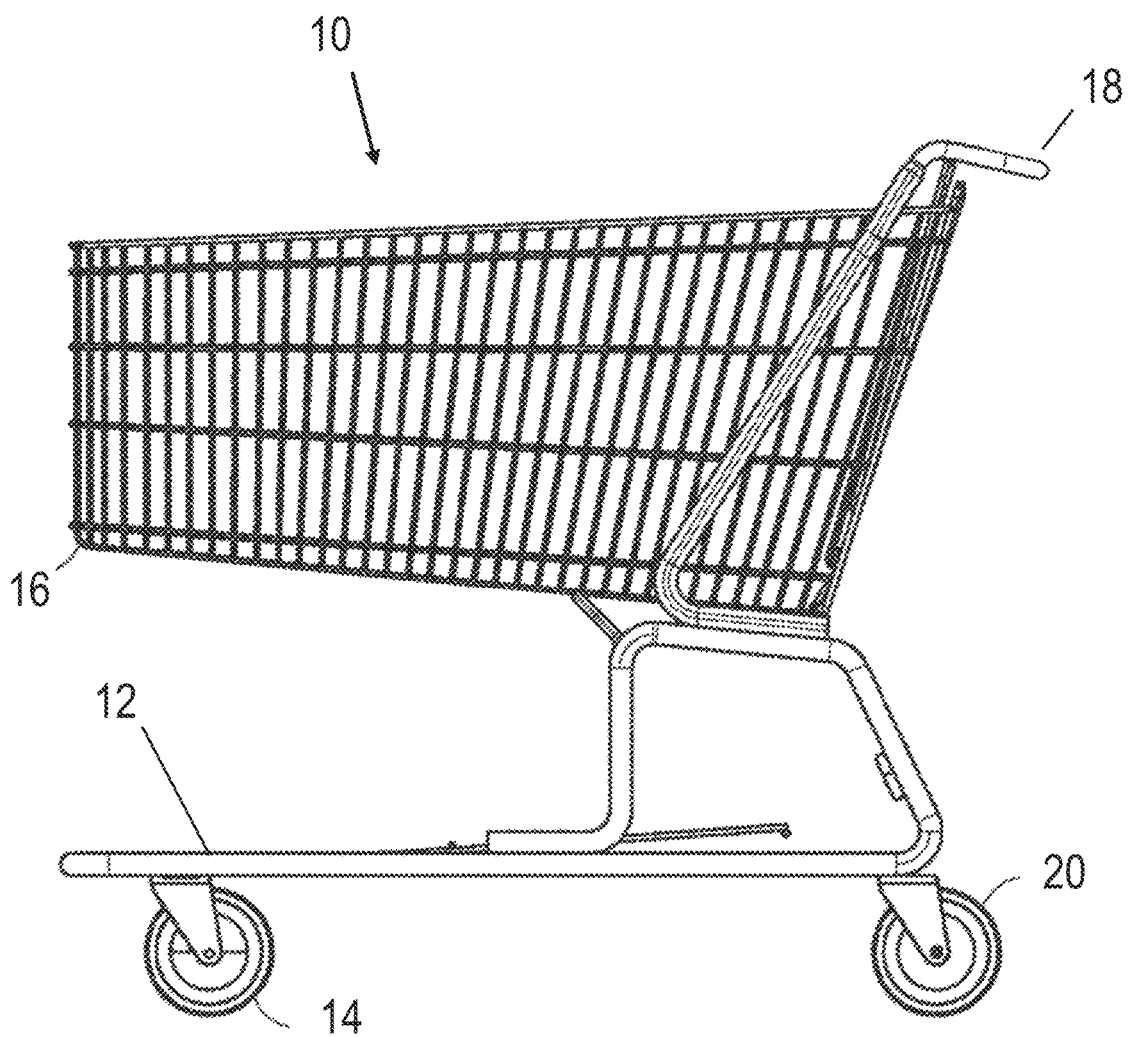
FIG. 1 is a perspective view of a multi-wheeled apparatus comprising a plurality of wheels connected to the shopping cart via a caster assembly.

FIG. 1 is a perspective view schematically depicting a multi-wheeled apparatus, such as a shopping cart (also called a trolley), luggage cart, hospital cart, etc. In various embodiments described herein, the multi-wheeled apparatus is human-powered and/or non-self-propelled (e.g., non-motorized). The multi-wheeled apparatus 10 is schematically depicted as including a frame 12 supported by a plurality of wheels 14, at least some of which may be supported by caster assemblies 20. The caster assemblies 20 allow rotation of the wheels 14 independent of the orientation of the frame 12, providing increase mobility. In some embodiments, the front wheels may be supported by the caster assemblies 20, while the rear wheels may be fixed in orientation relative to the frame 12. In some embodiments, all of the wheels 14 may be supported by the caster assemblies 20.

The multi-wheeled apparatus 10 may include, for example, a shopping cart or trolley as shown in FIG. 1, and may include additional components supported by the frame 12, such as a basket 16, a handle 18, and other components not specifically illustrated herein. The portion of the frame 12 to which the wheels 14 are attached may be trapezoidal or any other suitable shape. For example, the wheels 14 near the front of the multi-wheeled apparatus 10 may be closer to one another than the wheels 14 at the back of the apparatus 10. The height of the attachment locations for the wheels 14 may vary, depending on such parameters as the size of the wheel 14 to be attached, and whether the wheel 14 is attached via a caster assembly 20, which may add height to the overall wheel assembly.

If the frame 12 is bent or otherwise damaged, altering the height of a point at which a wheel is to be attached, not all of the wheels will be able to be in contact with an underlying flat surface at any given time. Additionally, when the apparatus 10 travels over uneven ground (e.g., bumps, curbs, divots, potholes, stones, etc.), one or more wheels 14 may not be in contact with the ground. This may cause an adverse effect on the stability and/or operability of the multi-wheeled apparatus 10. For example, the multi-wheeled apparatus 10 may shift or rock back and forth between positions during operation, and may otherwise affect the operation of the multi-wheeled apparatus 10. The wheel coming in and out of contact with the ground can cause increased or uneven wear on the wheel, can affect dead reckoning or other navigation systems (such as is described in U.S. Pat. No. 9,731,744, the entirety of which is hereby incorporated by reference herein), and/or can generate unwanted noise.

In some embodiments, a shopping cart or other multi-wheeled apparatus may be configured to detect rolling of a wheel structure, such as to determine when the shopping cart is in motion. This detection of rolling of a wheel can be used, for example, as part of a security mechanism which can lock the wheel in place under certain conditions, such as the removal of the shopping cart from a geographical region. When no rolling of a wheel of the shopping cart is detected, such a system may assume that the shopping cart is not in motion, and the system may remain in a sleeping or inactive state, rather than an awake or active state in which the movement of the shopping being detected and measured. This may result in the system failing to detect movement of the shopping cart when the wheel is not in contact with the ground, or inaccurately detecting the distance and/or direction traveled due to sporadic contact between the wheel and the ground.

When a dead reckoning system is used, this may provide an inaccurate indication of the location of the shopping cart, due to undetected movement of the shopping cart when the wheel is not in contact with the ground. This may result in the undesired locking of a wheel of the shopping cart, or a failure to lock the wheel of the shopping cart under conditions when the wheel should be locked. So long as contact is maintained between the wheel and the ground, the rolling of the wheel in response to movement of the shopping cart can be accurately detected, and the location of the shopping cart can be more accurately monitored.

In some embodiments, the wheel may be supported by a caster fork which is hingedly or pivotally coupled to the remainder of the caster assembly, providing a range of vertical travel for a wheel supported by the caster fork. This vertical travel range allows the wheel to maintain contact with the ground, even if the frame is bent or the ground is uneven. In some embodiments, the range of travel enables the caster to act as a shock absorber. In various embodiments, the caster is configured to reduce or avoid shock loads from being transmitted through the wheels 14 to the frame 12, to goods positioned therein (e.g., in the basket 16), and/or to the hands of a person pushing the apparatus 10 using the handle 18.

Figure 2A:
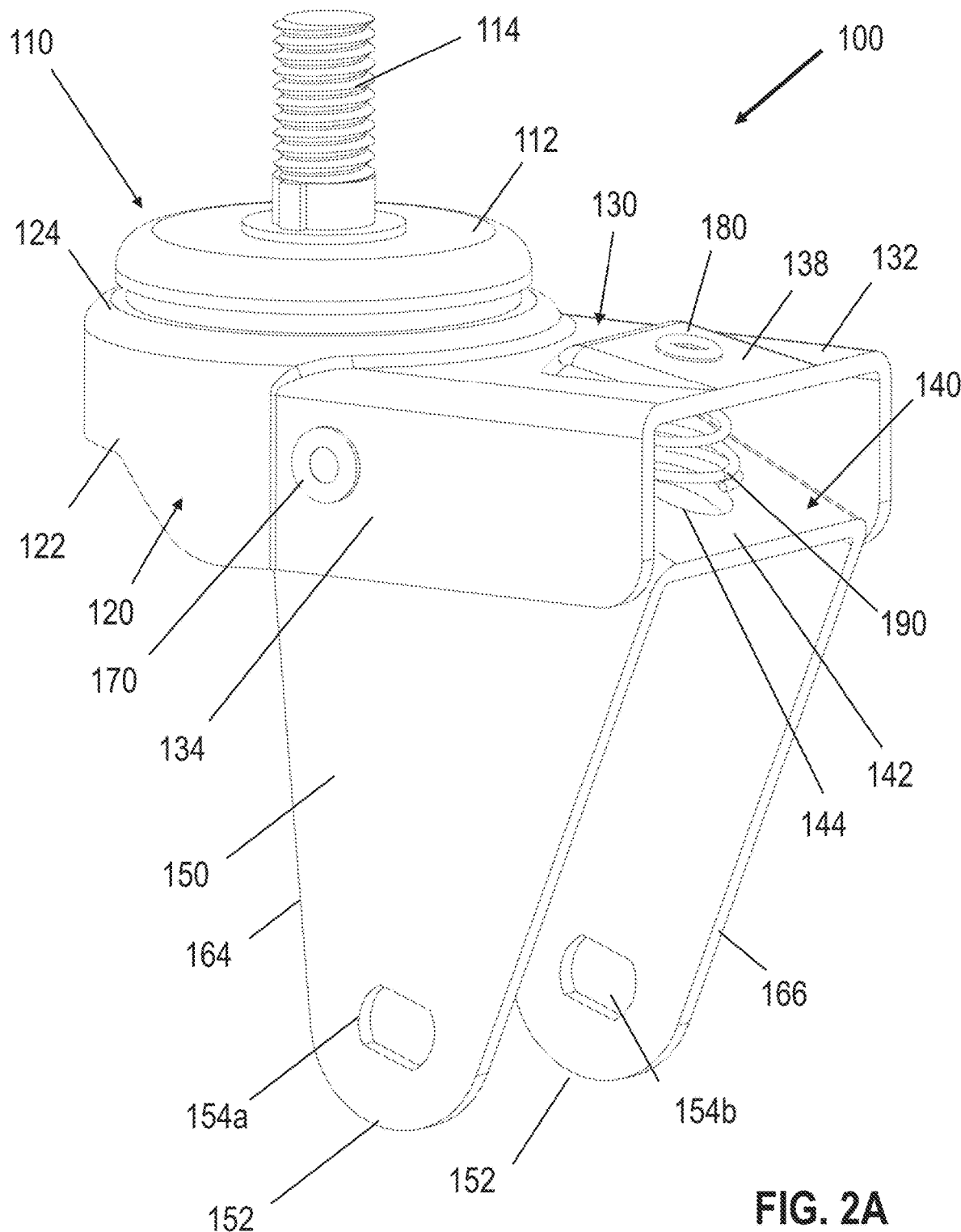
FIG. 2A is a perspective view of an embodiment of a self-adjusting caster assembly.
Figure 2B:
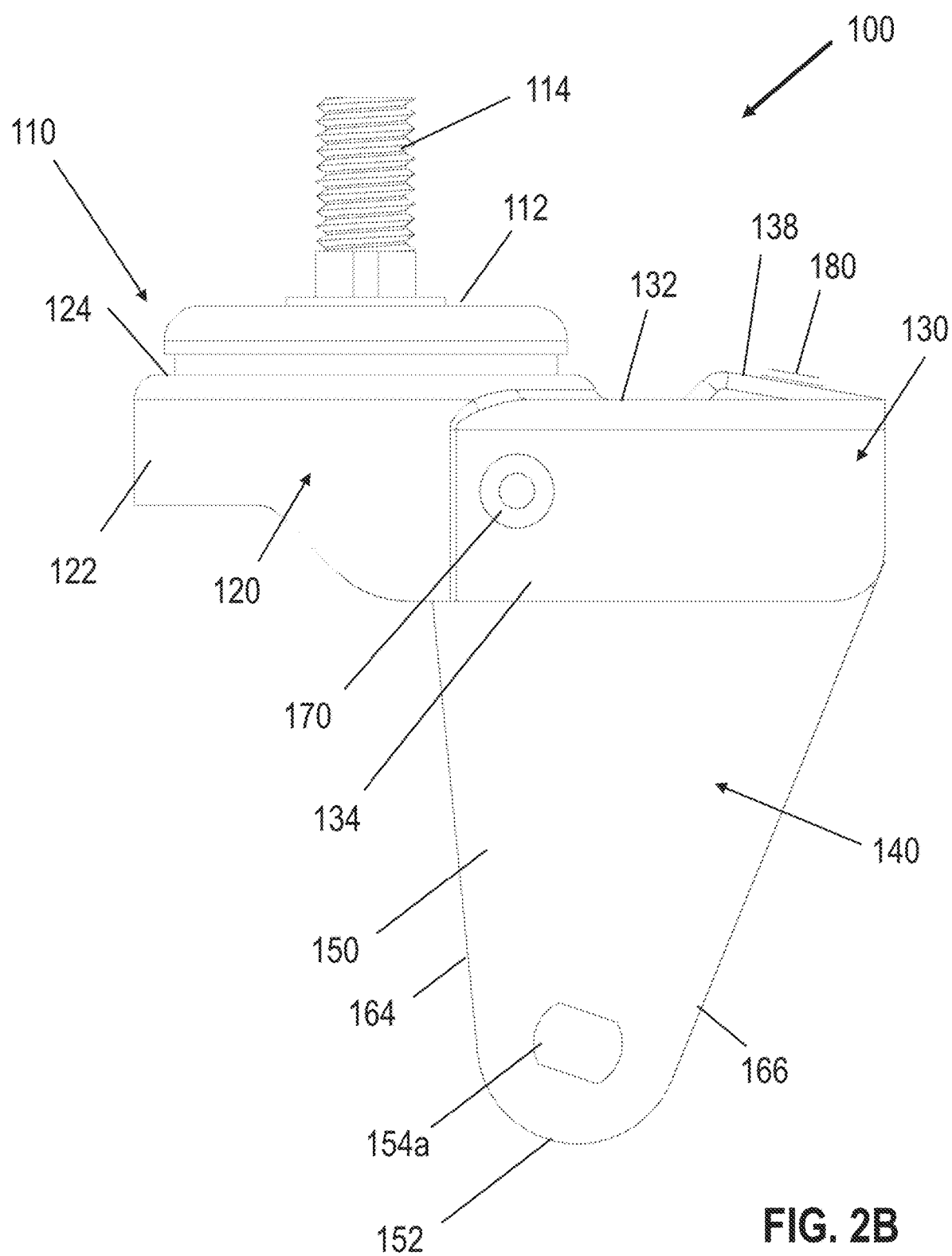
FIG. 2B is a left side view of the self-adjusting caster assembly of FIG. 2A.
Figure 2C:
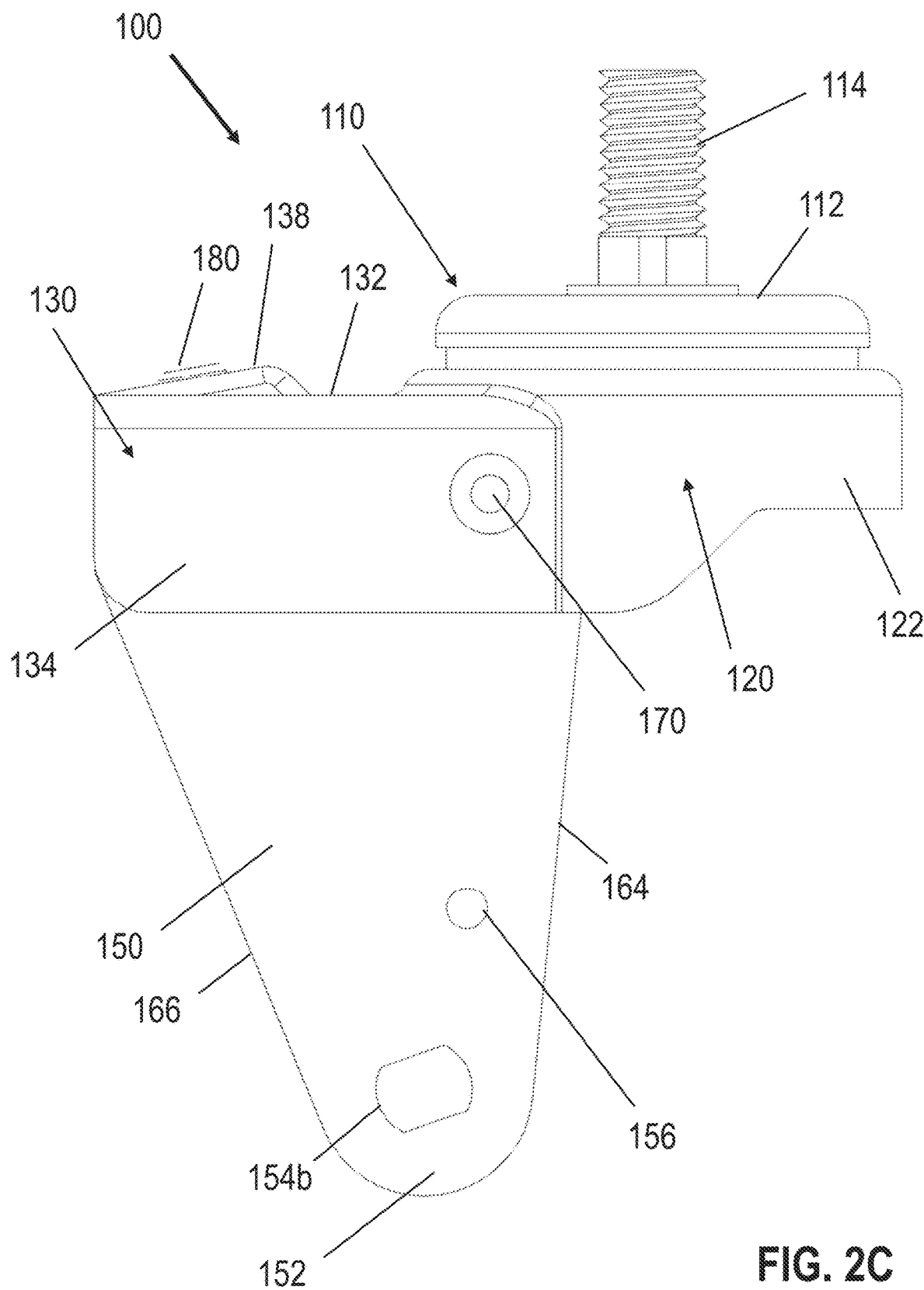
FIG. 2C is a left side view of the self-adjusting caster assembly of FIG. 2A.
Figure 2D:
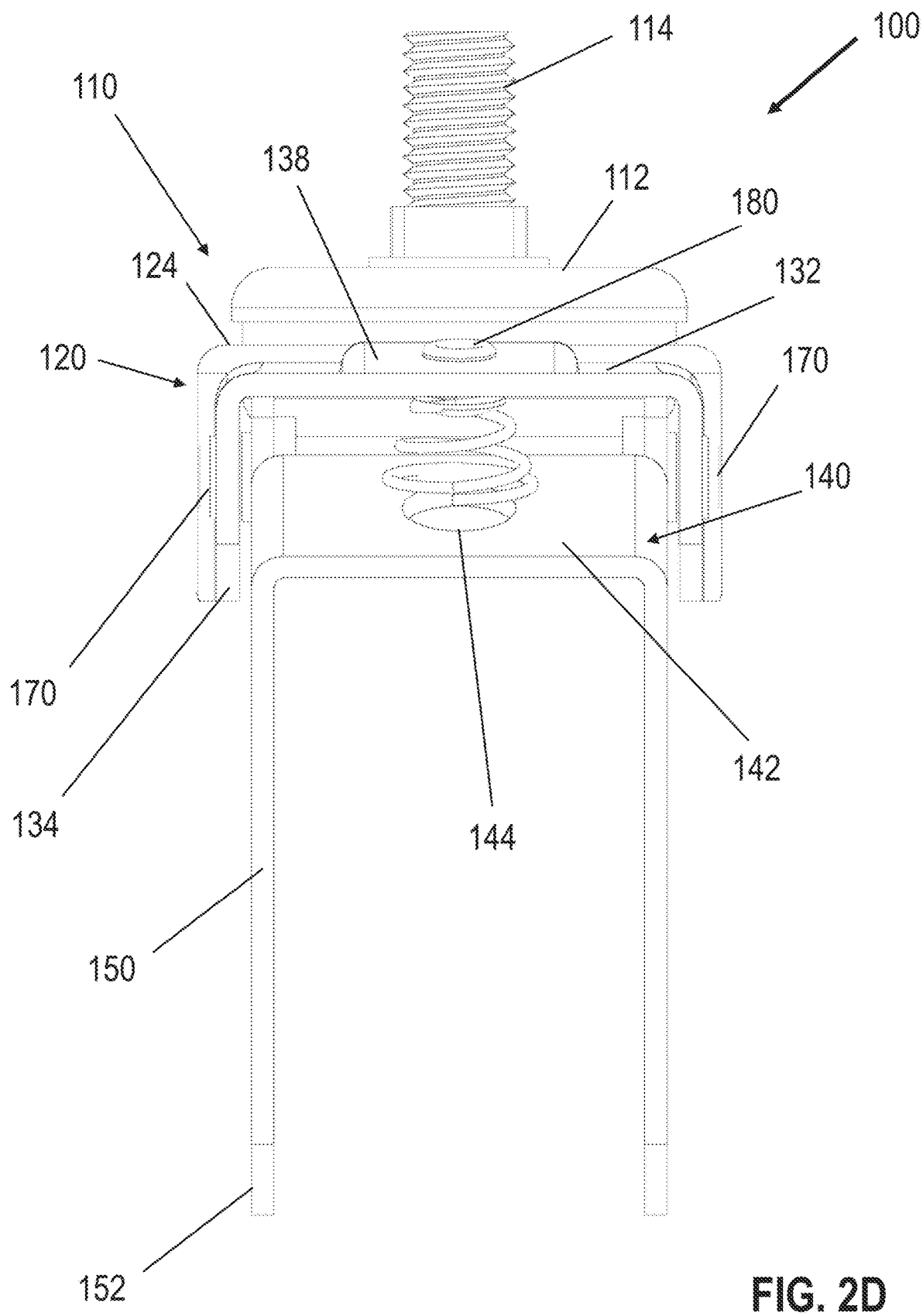
FIG. 2D is a front view of the self-adjusting caster assembly of FIG. 2A.
Figure 2E:
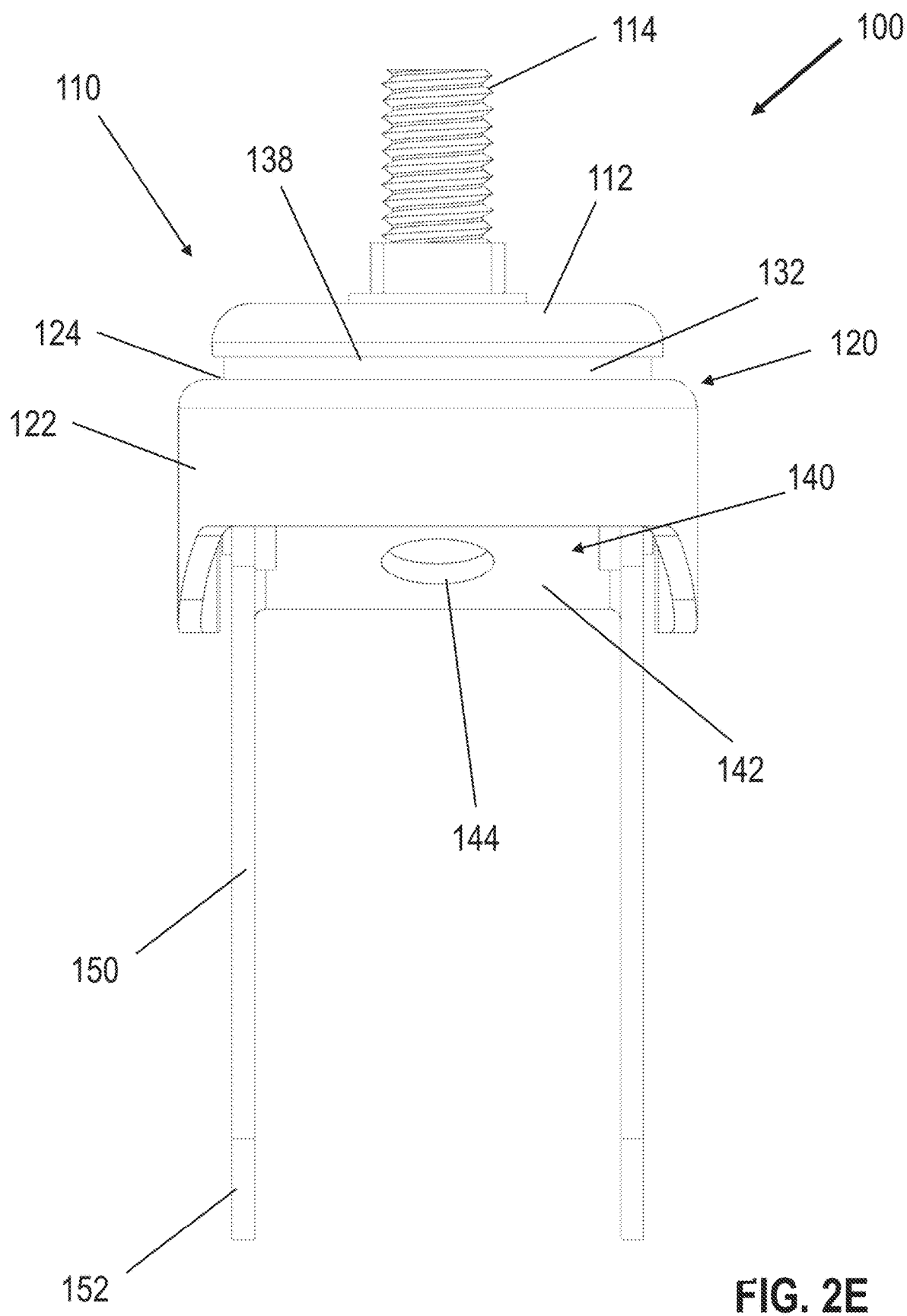
FIG. 2E is a rear view of the self-adjusting caster assembly of FIG. 2A.
Figure 2F:
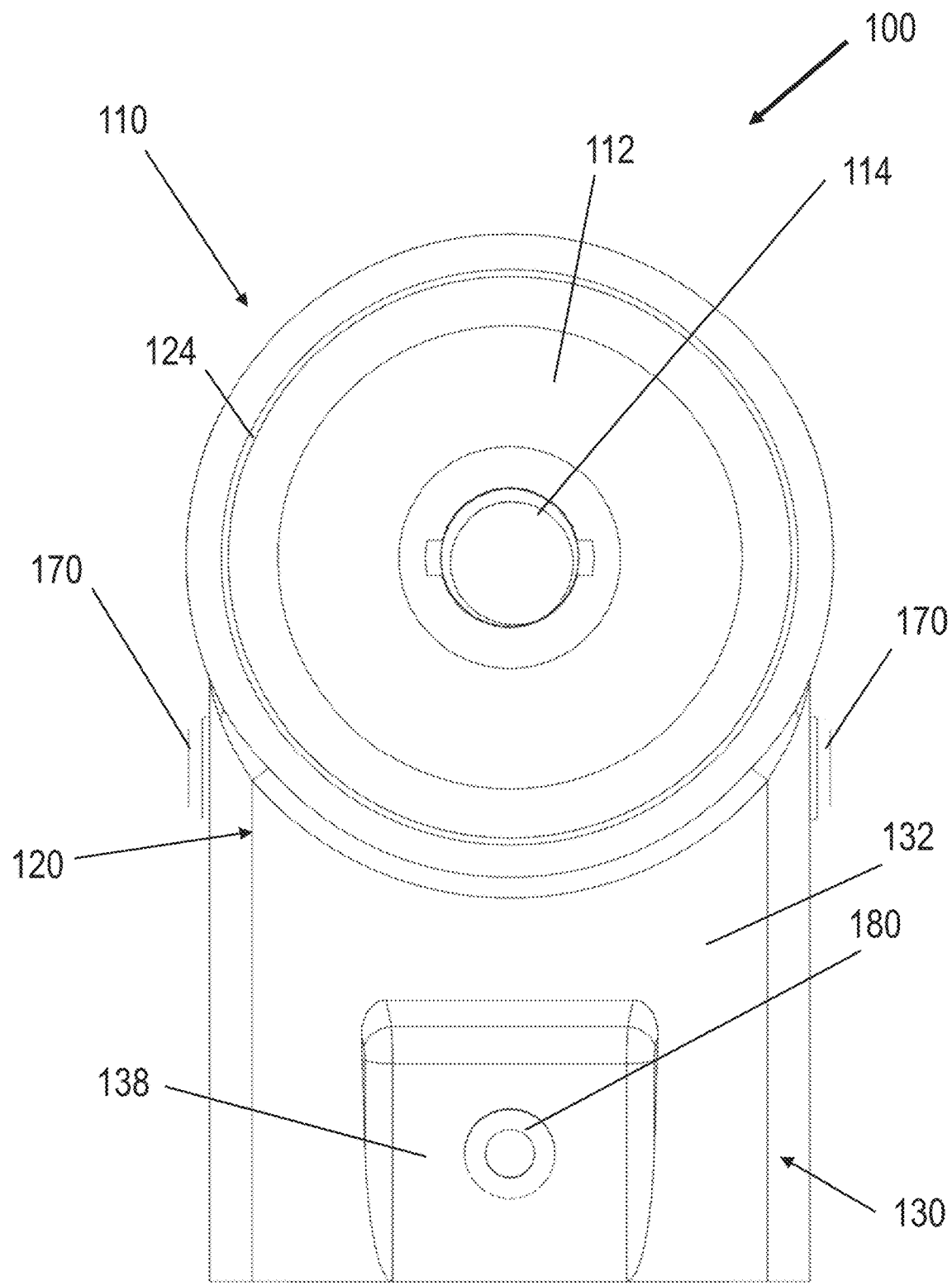
FIG. 2F is a top plan view of the self-adjusting caster assembly of FIG. 2A.
Figure 2G:
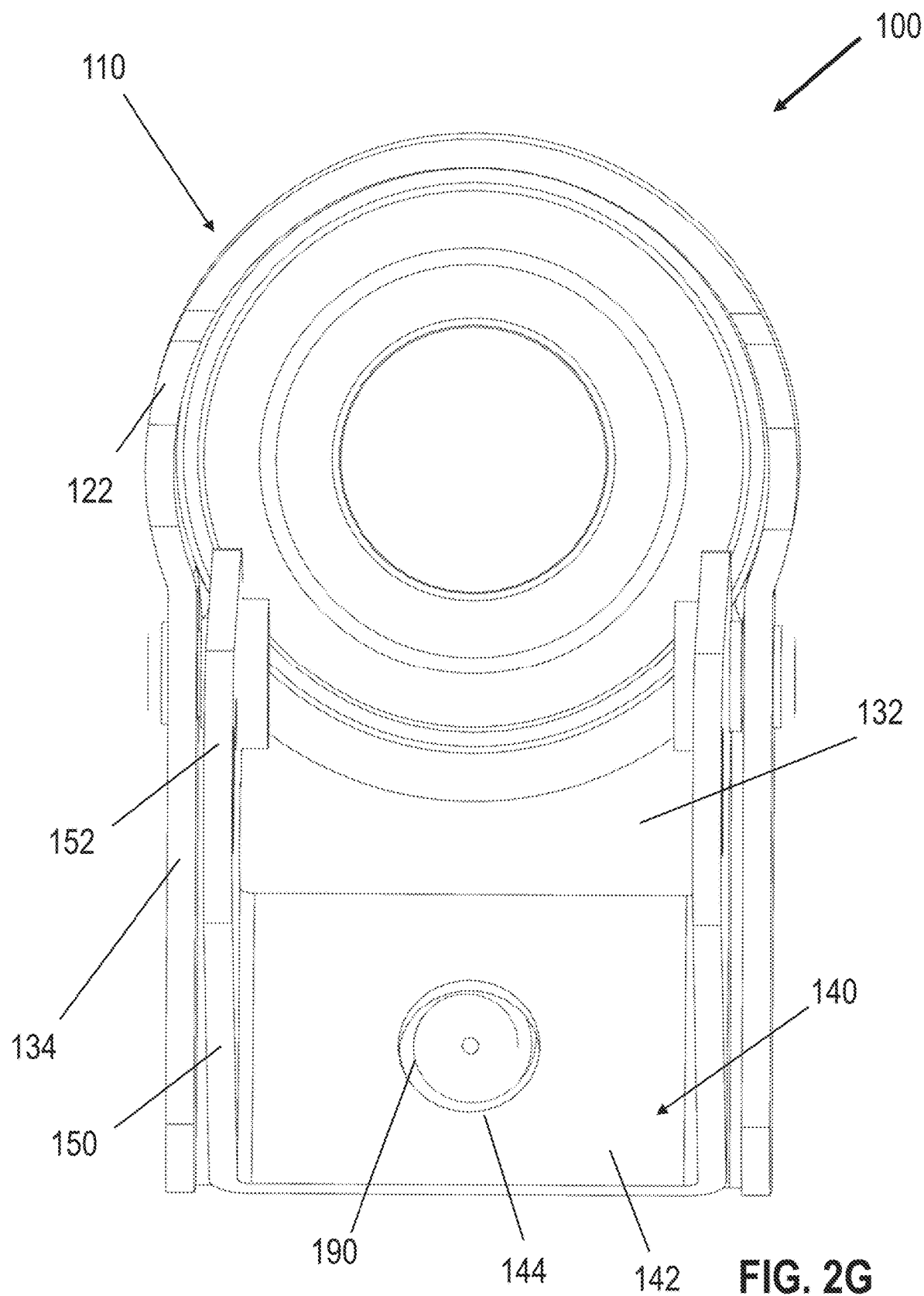
FIG. 2G is a bottom plan view of the self-adjusting caster assembly of FIG. 2A.

FIG. 2A is a perspective view of an embodiment of a self-adjusting caster assembly 100. FIG. 2B is a left side view of the self-adjusting caster assembly of FIG. 2A. FIG. 2C is a left side view of the self-adjusting caster assembly of FIG. 2A. FIG. 2D is a front view of the self-adjusting caster assembly of FIG. 2A. FIG. 2E is a rear view of the self-adjusting caster assembly of FIG. 2A. FIG. 2F is a top plan view of the self-adjusting caster assembly of FIG. 2A. FIG. 2G is a bottom plan view of the self-adjusting caster assembly of FIG. 2A.

The caster assembly 100 includes an upper frame and bearing assembly 110, which is pivotally coupled to a caster fork 140. The upper assembly 110 includes a thrust bearing 112 and a frame 120, where a lower race of the thrust bearing 122 is coupled to or integral with the frame 120. The upper race of the thrust bearing 112 is coupled to a kingpin or threaded stem 114. The thrust bearing 112 allows the frame 120 to rotate about a rotational axis aligned with the threaded stem 114.

In the illustrated embodiment, the frame 120 includes a cylindrical section 122 radially outward of the thrust bearing 112 and extending downward from a circular portion 124 of the frame 120. A radially extending portion 130 of the frame 120 includes an upper section 132 and at least one (e.g., two) downwardly extending sections 134 generally orthogonal to the upper section 132, forming an inverted square U-shaped cross-sectional shape. The downwardly extending sections 134 each include an aperture at which a connector pin 170 forms a hinged connection between the caster fork 140 and the frame 120. This hinged connection allows rotation of the caster fork 140 relative to the frame 120 about an axis of rotation extending through the centers of the connector pins 170.

The upper section 132 includes a shallow upward protrusion including an angled section 138 oriented at a slight angle to the remainder of the upper section 132, which may provide clearance for the compressed biasing member, as discussed in greater detail herein. The angled section 138 may include an aperture 139 extending therethrough to facilitate retention of a biasing member relating to the frame 120, as discussed in greater detail herein.

The caster fork 140 includes a central section 142 and a pair of downwardly-extending arms 150 oriented generally orthogonal to the central section 142. The caster arms 150 taper in width with increased distance from the central section 142, and include mounting apertures 154a, 154b near the lower end 152 of the arms 150. The central section 142 of the caster fork 140 includes an aperture 144 extending therethrough, which may be used to retain an end of a biasing member, as discussed in greater detail below In the illustrated embodiment, one of the arms 150 also includes an aperture 156 located above the mounting aperture 154a. The mounting apertures 154a, 154b, 156 can be used to support a wheel assembly (not shown). The shape of the apertures 154a, 154b can be used to hold a wheel assembly in a specific position relative to the plane of an underlying surface. In the particular embodiment illustrated in FIG. 2A, the mounting apertures 154a, 154b have a pair of generally circular arcs connected by two generally linear edges which may be defined by generally parallel chords of a circle defining the circular arcs. In other embodiments, however, a variety of other suitable shapes may be used for the mounting apertures 154a, 154b.

In the illustrated embodiment, the mounting apertures 154a, 154b are in the illustrated embodiment radially outward, relative to the rotational axis of the bearing 112, of the connector pins 170. As the caster fork 140 rotates relative to the frame 120, the inner edges 164 of the caster fork arms 150 become closer to perpendicular relative to the upper section 132 of the frame 120. This increases the vertical distance between the mounting apertures 154a, 154b and the frame 120, as measured in a direction normal to the plane of the upper section 132 of the frame 120.

A biasing member, which in the illustrated embodiment is a conical coiled spring 190, is located between the central section 142 of the caster fork 140 and the upper section 132 of the frame 120. The biasing member may be configured to bias the caster fork to a rotational position in which the central section 142 of the caster fork 140 is spaced apart from the upper section 132 of the frame 120. When a load is applied to the caster assembly 100, the conical coiled spring 190 is compressed due to the upper section 132 of the frame 120 being pushed toward or against the central section 142 of the caster fork 140. The conical shape of the coiled spring 190 allows the spring 190 to compress in a compact manner into a shape which can be substantially the same height as the wire of the spring. This compact compressed shape, along with the clearance provided by the angled section 138 and the clearance provided by the aperture 144 in the caster fork 140, allows the central section 142 of the caster fork 140 to be brought into close proximity or into contact with the upper section 132 of the frame 120. In some embodiments, the flattened biasing member 190, along with a portion of the retention structure 180, can be compressed into the space provided by the aperture 144 in the caster fork 140, so that the caster fork 140 can be brought into direct contact with the frame 120.

The combination of the hinged caster fork 140 and the biasing member 190 allows the caster assembly 100 to compensate for a degree of distortion in a frame 120 supporting a plurality of wheels. If a wheel mounted in the caster is not in contact with the ground, due to warping of the supporting frame 120, the biasing member will push the hinged caster fork away from the remainder of the frame 120, increasing the vertical distance between the mounting apertures and the frame 120. This, in turn, increases the vertical distance between the frame 120 and the lower surface of the wheel. As long as the distortion of the supporting frame 120 is within a given range, dependent on the size and design of the caster assembly 100, this increased distance will keep the wheel in contact with the ground or floor surface, allowing sustained operation of the wheeled apparatus despite distortion in the frame 120 or other damage to the frame 120. The travel range of the wheel may be dependent upon such factors as the size of the components, as well as the distance between the connector pins 170 and the biasing member 190. In some embodiments, the travel range may be at least about ¼ inch and/or less than or equal to about ¾ inch, although in other embodiments, a larger or smaller travel range may be provided. For example, in some embodiments, the travel range may be less than one inch, although in other embodiments, or less than ½ inch, although larger travel ranges may also be provided.

Figure 3:
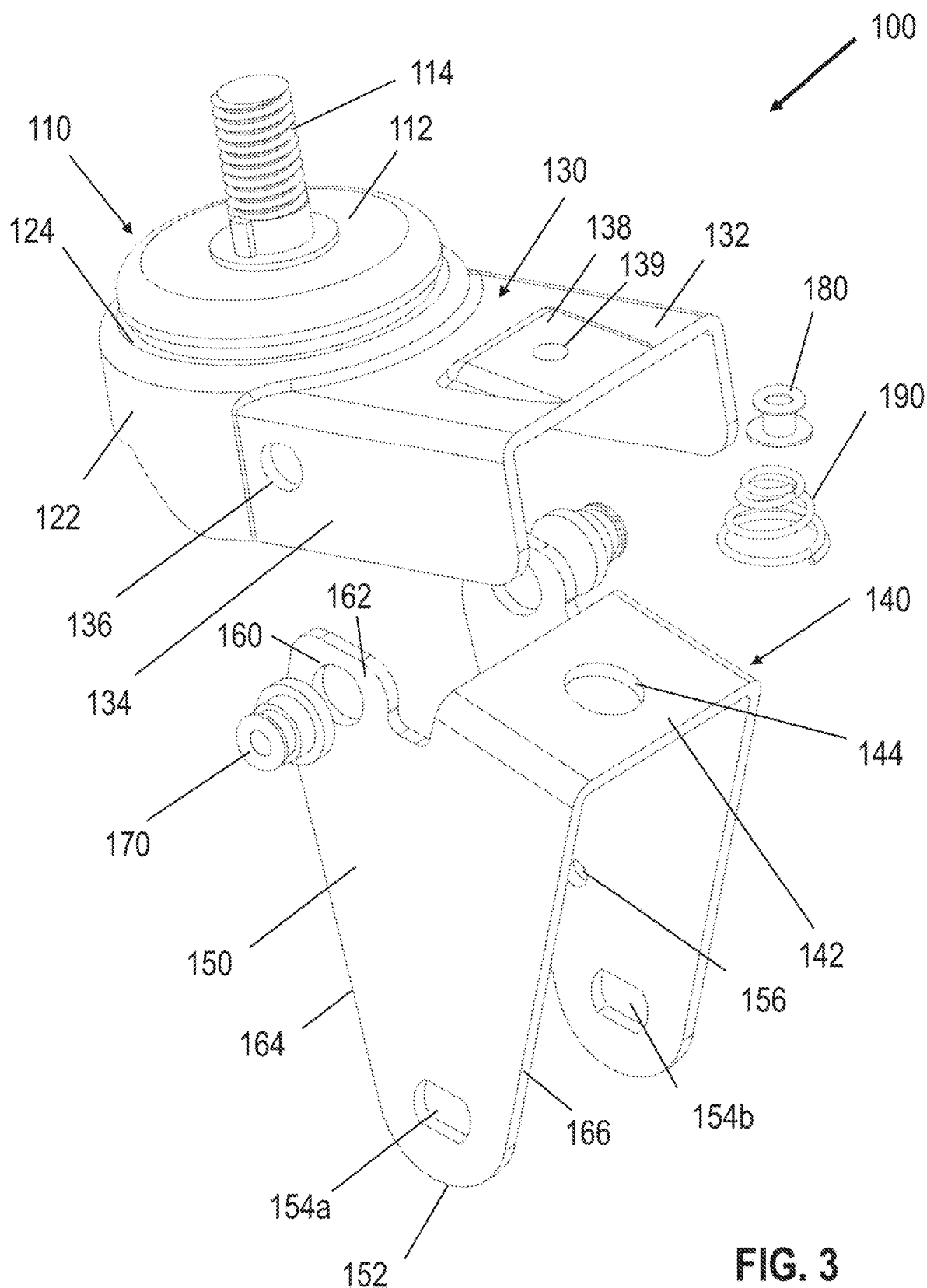
FIG. 3 is a perspective exploded view of the self-adjusting caster assembly of FIG. 2A.

FIG. 3 is a perspective exploded view of the self-adjusting caster assembly of FIG. 2A. In the illustrated embodiment, the caster assembly 100 includes two connector pins 170 configured to pivotally connect the caster fork 140 to the frame 120. Each connector pin 170 extends through an aperture 136 in the frame 120, as well as through an aperture 160 in the caster fork arms 150.

As discussed in greater detail below, the cross-sectional dimensions of the apertures 136 in the frame 120 and the apertures 160 in the caster fork arms 150 may be different. In the illustrated embodiment, the cross-sectional sizes of the apertures 160 in the caster fork arms 150 are larger than the cross-sectional sizes of the apertures 136 in the frame 120, although other configurations and relative sizes may also be used in other embodiments. The cross-sectional dimension of the connector pin 170 is wider at its inner end and its outer end than the cross-sectional diameters of the apertures 136 in the frame 120 and the apertures 160 in the caster fork arms 150.

The connector pin design depicted in FIG. 3 (and depicted in greater detail in FIG. 7) is one exemplary design, although a wide variety of other connective structures may also be used to achieve the hinged connection. For example, in some embodiments, a single pin (e.g., axle) extends through both apertures 136 in the frame 120 and both apertures 160 in the caster fork arms 150 may be used.

The caster assembly 100 also includes a retention structure 180 configured to retain the first end 192 of the biasing structure 190 relative to the frame 120. In particular, the retention structure 180 (which is described in greater detail with respect to FIG. 8) may include a narrow neck portion configured to extend through the aperture 139 in the angled section 138 of the upper section 132 of the frame 120. The inner end of the retention structure 180 is configured to engage the first end 192 of the biasing structure 190, such as by being inserted through the narrowest coil in the conical coiled spring. The outer end of the retention structure 180 is configured to be located above the upper surface of the angled section 138 of the upper section 132 of the frame 120. The retention structure 180 may include a rivet or another suitable retention structure.

Figure 4A:
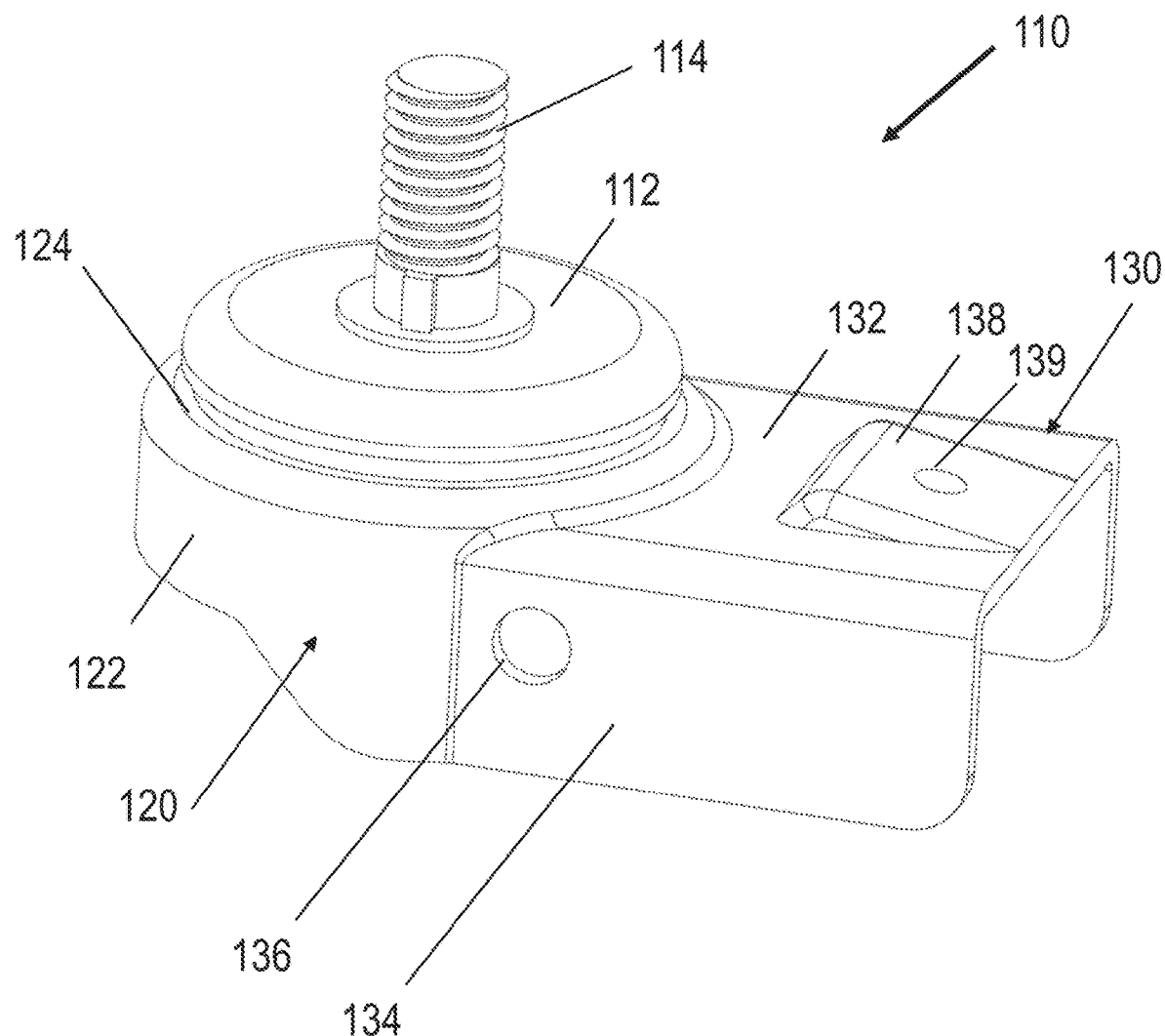
FIG. 4A is a top perspective view of the frame and bearing assembly of the self-adjusting caster assembly of FIG. 2A.
Figure 4B:
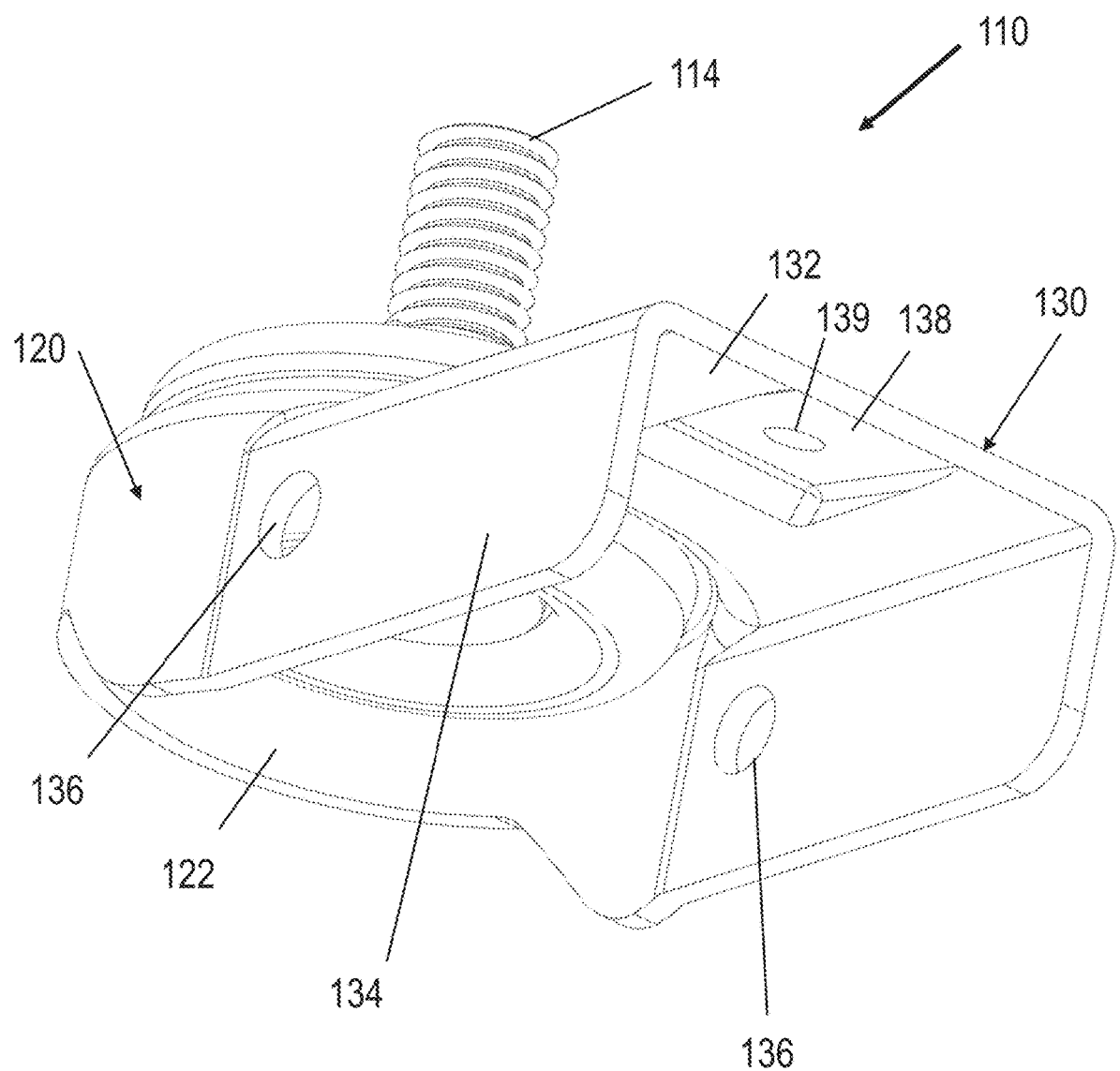
FIG. 4B is a bottom perspective view of the frame and bearing assembly of FIG. 4A

FIG. 4A is a top perspective view of the frame and bearing assembly of the self-adjusting caster assembly of FIG. 2A. FIG. 4B is a bottom perspective view of the frame and bearing assembly of FIG. 4A. In the illustrated embodiment, the radially extending portion 130 of the frame 120 extends sufficiently far from the rotational axis of the bearing 112 that a wheel assembly supported by the bearing assembly may be radially offset from the rotational axis of the bearing 112, whatever the position of the caster fork 140. When a multi-wheeled apparatus including a caster assembly 100 is pushed, pulled, or otherwise moved in a first direction, the radially extending portion 130 of the frame 120 supported by the caster assembly will trail the rotational axis of the bearing in a direction opposite the first direction.

Figure 5A:
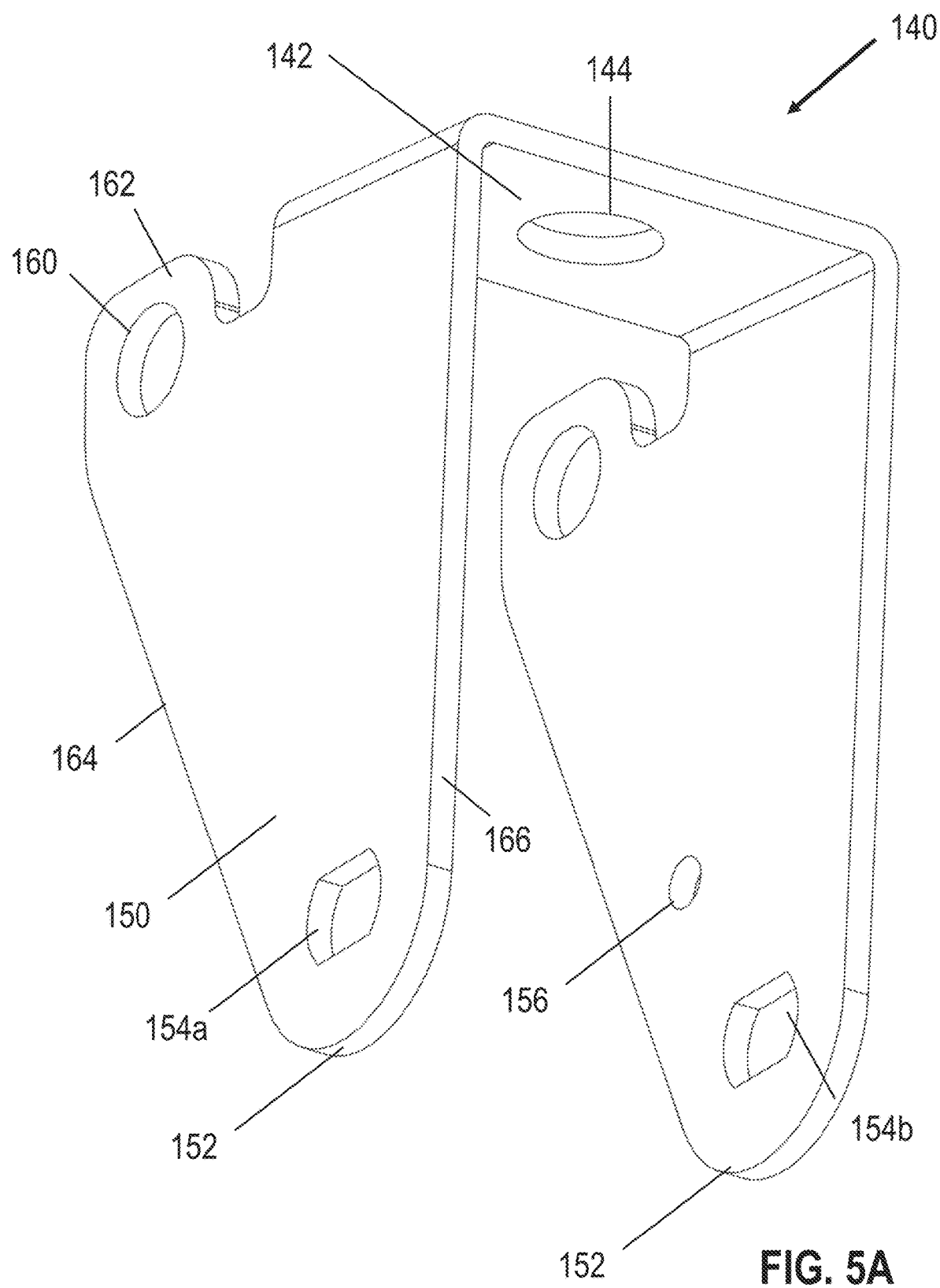
FIG. 5A is a perspective view of the caster fork of the self-adjusting caster assembly of FIG. 2A.
Figure 5B:
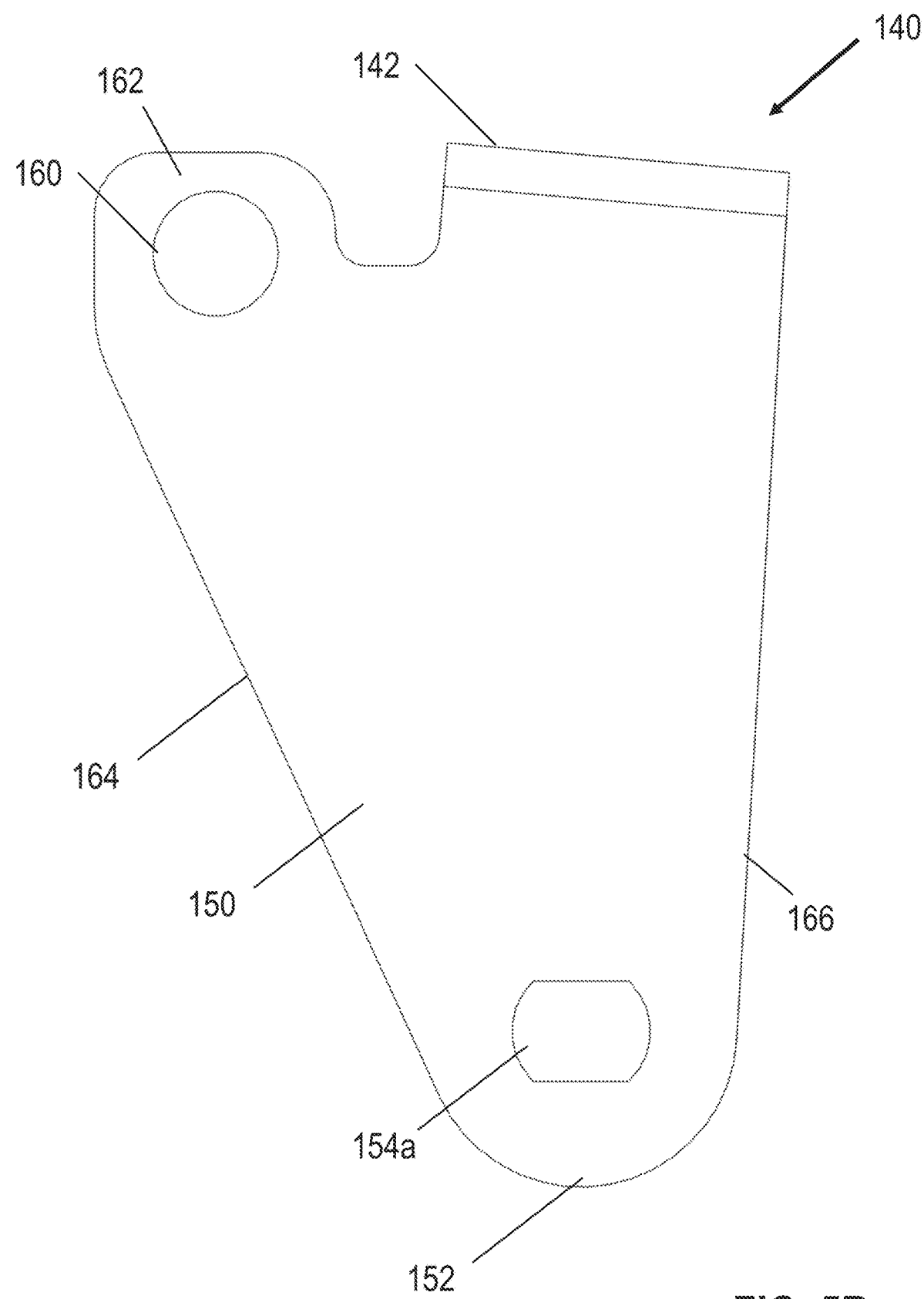
FIG. 5B is a side view of the caster fork of FIG. 5B.

FIG. 5A is a perspective view of the caster fork of the self-adjusting caster assembly of FIG. 2A. FIG. 5B is a side view of the caster fork of FIG. 5B. In the illustrated embodiment, the inner edges 164 of the caster fork arms 150 are oriented at an angle to the outer edges 166 of the caster fork arms 150, tapering toward a narrower, rounded section below the mounting apertures. The apertures 160 of the caster arms 150 in the illustrated embodiment extend through a portion of upwardly extending tabs 162. In the particular embodiment illustrated in FIG. 5A, the upper edges of the upwardly extending tabs 162 are oriented at a slight angle to the upper surface of the central section 142 of the caster fork 140.

In some embodiments, the shape of certain components of the caster fork 140 may interact with adjacent components of the frame 120 to serve as a stop inhibiting further rotation of the caster fork 140 relative to the frame 120. In other embodiments, the caster fork 140 may be dimensioned to move freely relative to the frame 120, with only the biasing member 190 and/or the central portion 132 of the frame 120 constraining the rotational position of the caster fork 140 relative to the frame 120.

Figure 6:
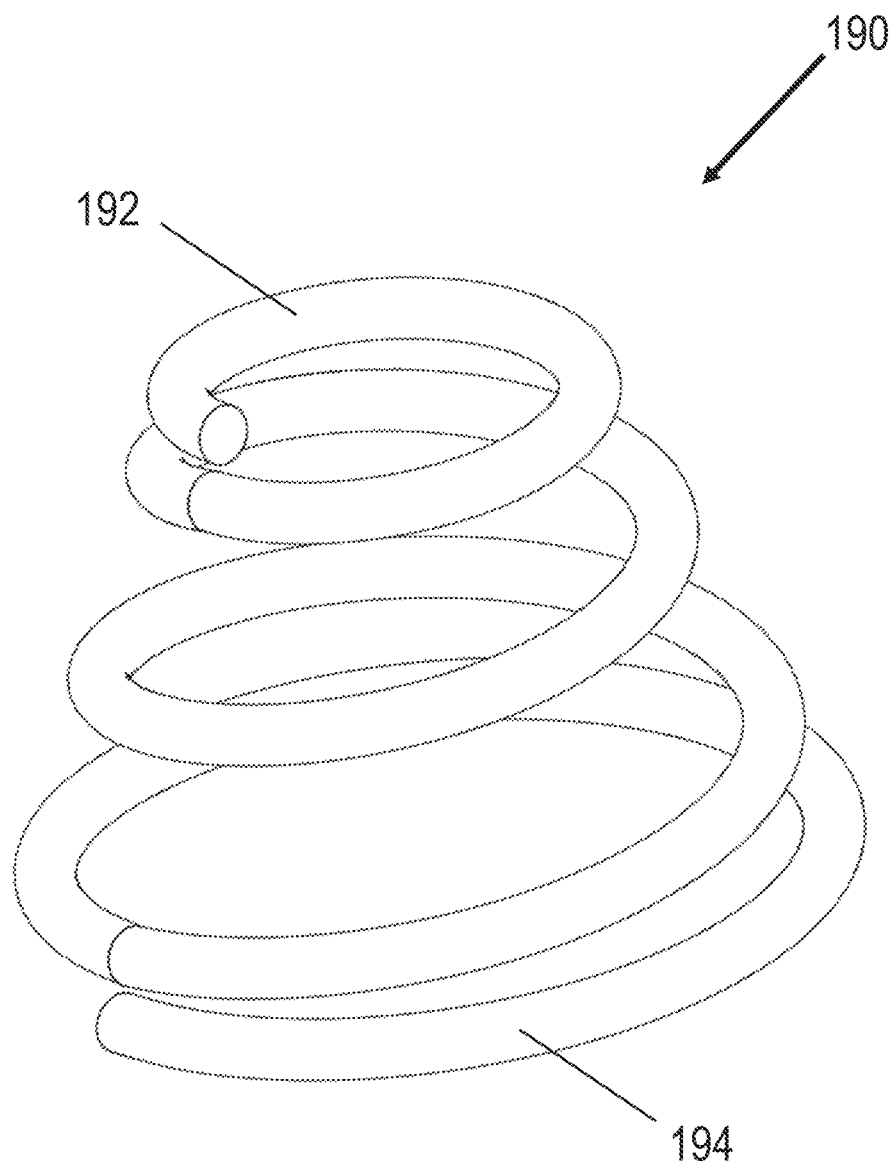
FIG. 6 is a perspective view of the biasing member of the self-adjusting caster assembly of FIG. 2A.

FIG. 6 is a perspective view of the biasing member 190 of the self-adjusting caster assembly of FIG. 2A. The biasing member 190 in the illustrated embodiment tapers in cross-sectional size between a first cross-sectional size at a first end 192 to a larger second cross-sectional size at a second end 194. In the illustrated embodiment, the biasing member 190 includes a coiled spring of substantially constant cross-sectional shape bent into a spiral of varying size, whose outer surface is generally conical in shape. The wider second end 194 may be configured to extend at least partially into the aperture 144 in the central portion 142 of the caster fork 140, in order to locate and retain the second end 194 therein. The first end 192 may be connected to the frame 120 via the retention structure 180, but may in other embodiments be directly connected to the frame 120.

As discussed above, the conical shape of the coiled spring allows the biasing member 190 in the illustrated embodiment to be compressed into a shape in which all of the coils of the biasing member lie in substantially the same plane. In other embodiments, however, other spring configurations, such as non-conical coiled springs or other suitable spring shapes may be use, as may other suitable biasing structures.

Figure 7:
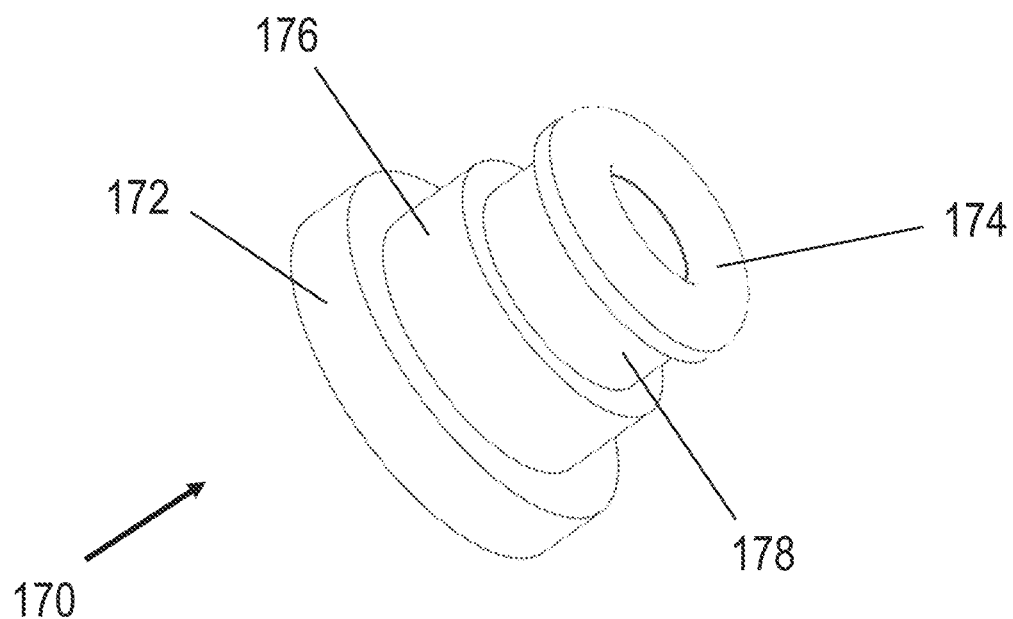
FIG. 7 is a perspective view of a connector pin used to couple the frame and bearing assembly to the caster fork of the self-adjusting caster assembly of FIG. 2A.

FIG. 7 is a perspective view of a connector pin 170 used to couple the frame 120 and bearing assembly to the caster fork of the self-adjusting caster assembly of FIG. 2A. In the illustrated embodiment, the connector pin 170 includes a narrow neck portion extending between an inner end 172 and an outer end 174. The neck portion of the connector pin 170 includes an inner cylindrical section 176 having a first cross-sectional dimension and an outer cylindrical section 178 having a second cross-sectional dimension. The first cross-sectional dimension may be different from the second cross-sectional dimension. The inner cylindrical section 176 may be dimensioned to be slightly smaller than the size of the apertures 160 of the caster arms 150, and the outer cylindrical section may be dimensioned to be slightly smaller than the size of the connector apertures 136 in the frame 120. In the illustrated embodiment, the inner cylindrical section 176 has a larger cross-sectional diameter than the outer cylindrical section 178, to accommodate the differing sizes of the apertures 160 of the caster arms 150 and the connector apertures 136 in the frame 120. This difference in diameter can help to ensure free rotation of the caster arm 140 relative to the frame 120.

In some embodiments, at least one of the inner end 172 and the outer end 174 may be formed by crimping a portion of the connector pin 170 after the connector pin 170 has been inserted through the apertures 160, 136. In some embodiments, at least one of the inner end 172 and the outer end 174 may be adhered, welded, or otherwise fixed to the remainder of the connector pin 170 after the connector pin 170 has been inserted through the apertures 160, 136. In some embodiments, at least one of the inner end 172 and the outer end 174 may be formed from a resilient material which can be deformed and inserted through the smaller apertures 160, 136.

Figure 8:
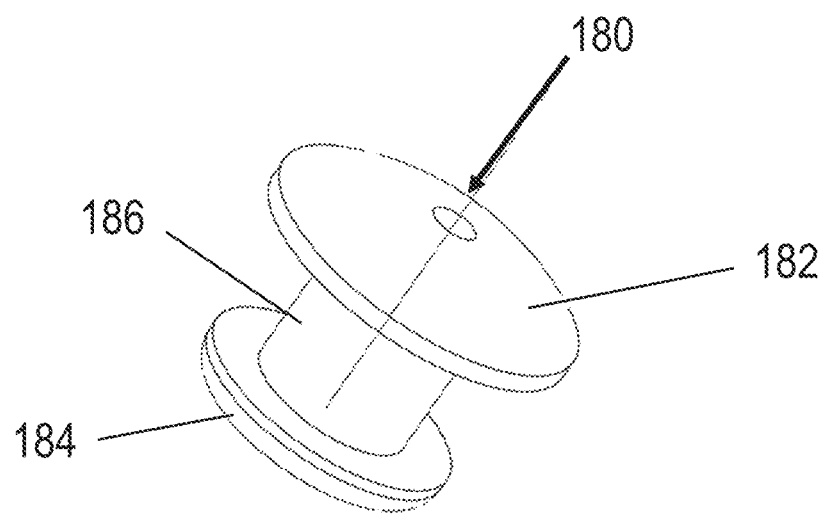
FIG. 8 is a perspective view of a retention feature configured to secure the biasing member relative to the frame and bearing assembly of the self-adjusting caster assembly of FIG. 2A.

FIG. 8 is a perspective view of a retention feature configured to secure the biasing member relative to the frame and bearing assembly of the self-adjusting caster assembly of FIG. 2A. The retention feature 180 includes a narrow neck portion 186 extending between an inner end 182 and an outer end 184. The inner end may have a cross-sectional shape which is larger than the coil of the biasing structure 180 at the first end 192 of the biasing structure 190. The neck portion 186 may have a portion with a cross-sectional shape which is smaller than the coil of the biasing structure 190 at the first end 192 of the biasing structure 190, allowing the neck portion 186 to extend through the coil at the first end 192 of the biasing structure 190, so that the wider inner end 182 retains the coil in place. The neck portion 186 is dimensioned to extend through the aperture 139 in the angled section 138, with the outer end 194 being wider than the aperture 139 in the angled section 138, to hold the outer end 184 in place relative to the frame.

Like the connector pin 170, the retention feature 180 may be formed in any suitable manner, such as by crimping a portion of the retention feature 180 after the neck portion 186 has been inserted through the aperture 139. In some embodiments, at least one of the inner end 182 and the outer end 184 may be adhered, welded, or otherwise fixed to the remainder of the retention feature 180 after the neck portion 186 has been inserted through the aperture 139. In some embodiments, at least one of the inner end 182 and the outer end 184 may be formed from a resilient material which can be deformed and inserted through the smaller aperture 139.

Figure 9A:
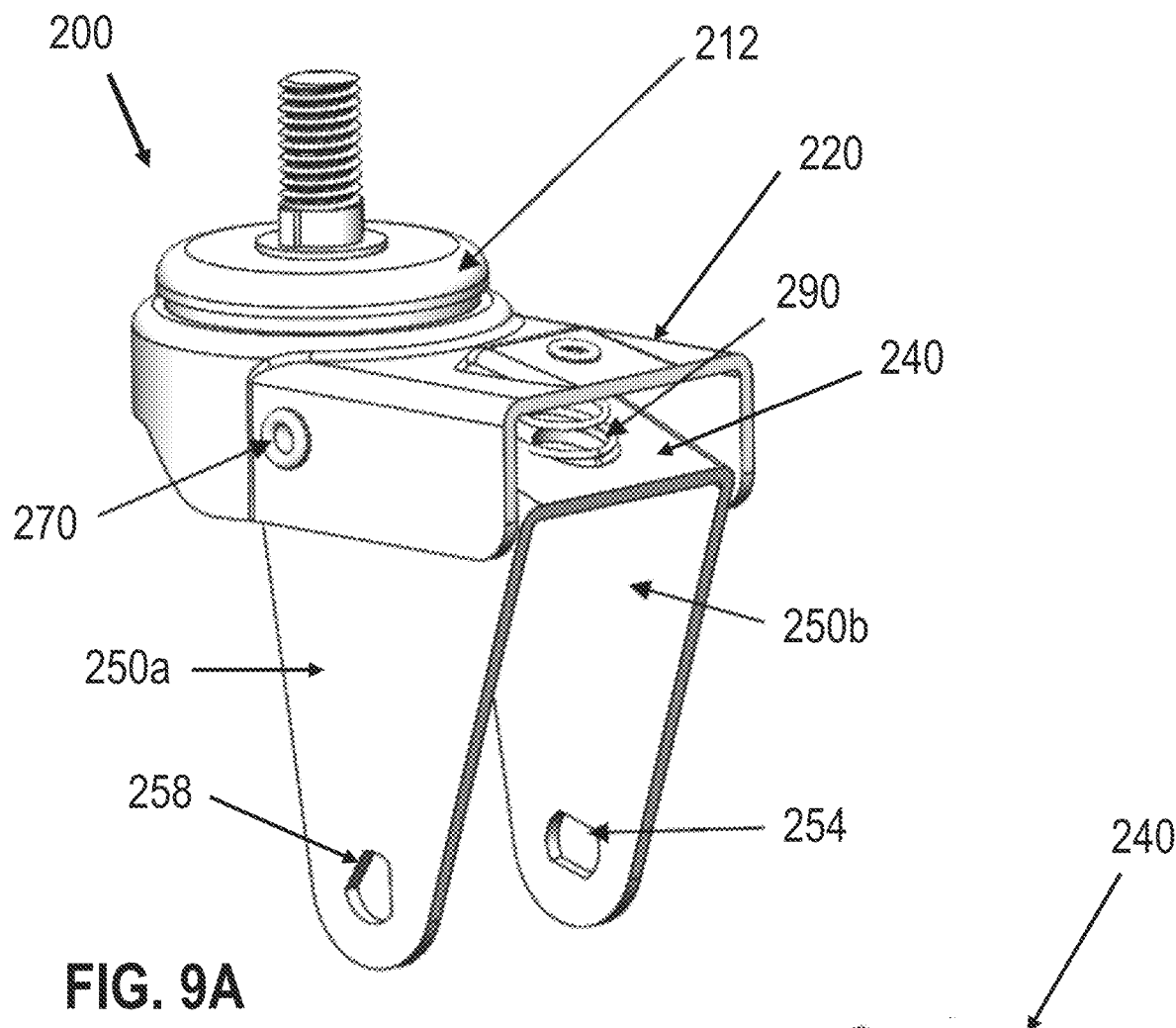
FIG. 9A is a perspective view of another embodiment of the self-adjusting caster assembly.
Figure 9B:
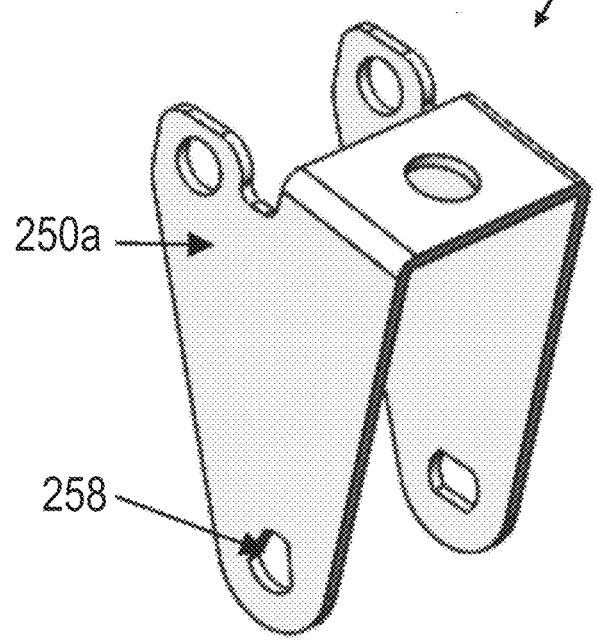
FIG. 9B is a perspective view of the caster fork of the self-adjusting caster assembly of FIG. 9A.

FIG. 9A is a perspective view of another embodiment of the self-adjusting caster assembly. FIG. 9B is a perspective view of the caster fork of the self-adjusting caster assembly of FIG. 9A. The caster assembly 200 is similar to the caster assembly 100 of FIG. 2A, including a thrust bearing 212, a frame 220, and a caster fork 240. The caster fork 240 is pivotally coupled via connectors 270 to the frame 220 with a biasing member 290 located between the caster fork 240 and the frame 220.

The caster assembly 200 differs from the caster assembly 100 of FIG. 2A in that one of the arms 250a of the caster fork 240 includes a mounting aperture 254 similar in shape to the mounting apertures 154a, 154b of the caster fork 140, while the other arm 250b of the caster fork includes a mounting aperture 258 with a different shape. The mounting aperture 258 has a pair of generally circular arcs connected by two generally linear edges which may be defined by two chords of a circle defining the circular arcs, where the chords are at an angle to one another. This angle between the two linear edges results in the lower circular arc being larger than the upper circular arc.

Although representative examples of the mounting apertures are specifically illustrated herein, a wide range of other mounting apertures may be used in conjunction with a wide range of suitable wheel assemblies to support a wheel using the caster arms of a caster fork. The number, shape, dimension and location of the mounting apertures may be adjusted to accommodate any desired wheel assembly design, and multiple apertures and/or adapters may be provided to allow a given caster assembly to be used with multiple wheel assemblies, and each mounting aperture and/or adapter may not necessarily be used with a particular wheel assembly.

Figure 10:
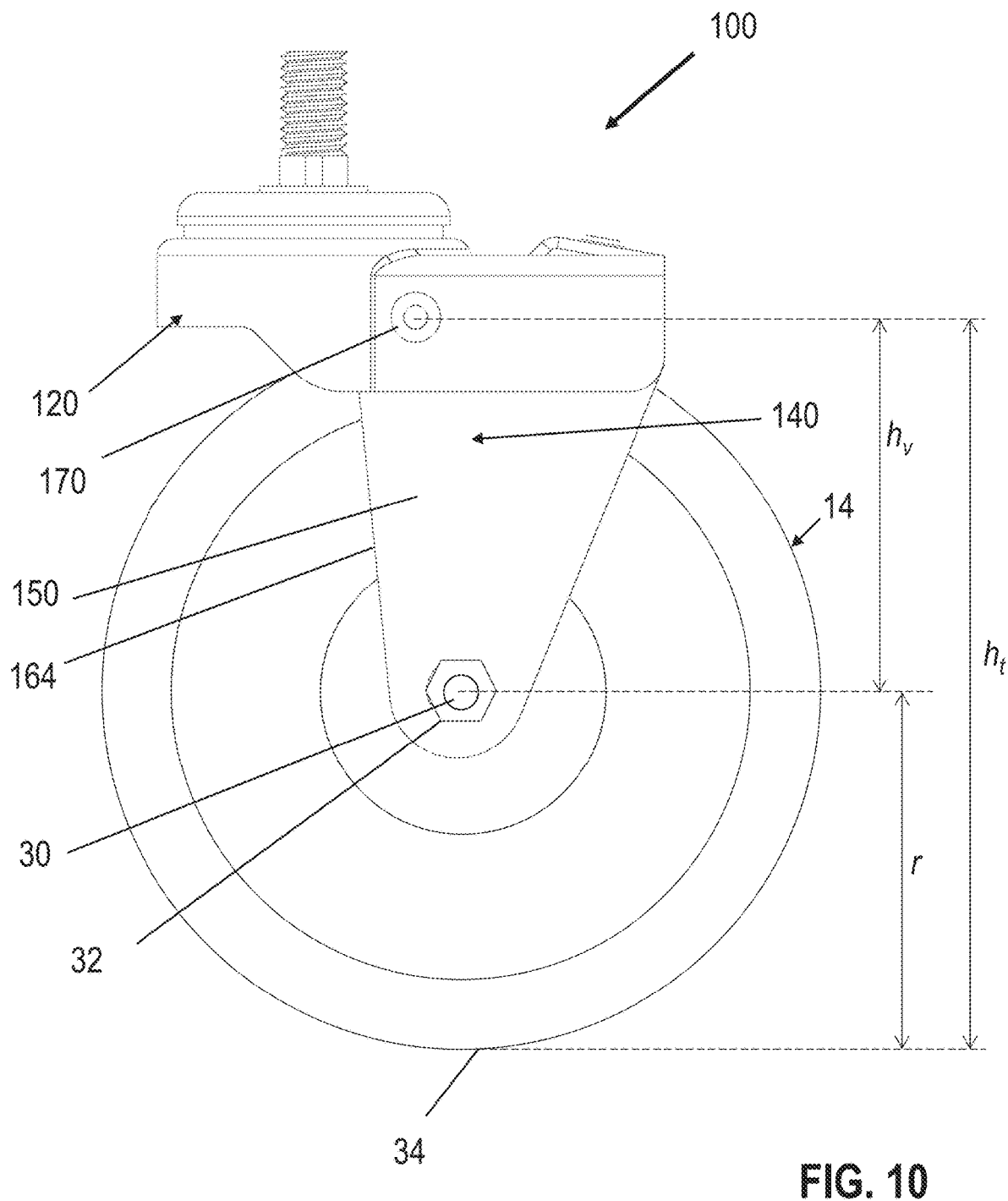
FIG. 10 is a side view of a self-adjusting caster assembly such as the self-adjusting caster assembly of FIG. 2A with a wheel assembly supported thereon.

FIG. 10 is a side view of a self-adjusting caster assembly such as the self-adjusting caster assembly of FIG. 2A with a wheel assembly supported thereon. As illustrated in the exemplary embodiment of FIG. 10 wheel assembly may include a wheel 14 configured to rotate around a wheel axle 30, and may include one or more bearings to facilitate this rotation. The wheel axle 30 may be inserted through the mounting apertures in the caster fork arms 150 and secured in place such as through the use of a nut 32, or other suitable retention structure. In other embodiments, a wheel axle may be secured in place relative to the caster fork arms by intervening components and suspended between the caster fork arms. Other possible mounting arrangements and configurations may also be used.

As can be seen in FIG. 10, the distance between a fixed point on the self-adjusting caster assembly 100, such as the distance h t between the connector pin 170 and the base 34 of the wheel 14, is a function of the radius r of the wheel and the vertical distance h, between the connector pin 170 and the wheel axle 30. The vertical distance h, between the connector pin 170 and the wheel axle 30 varies as the caster fork 150 rotates about the pivot point at the connector pin 170. As the caster fork 140 rotates, and the inner edges 164 of the caster forks 150 rotate upward towards the frame 120 and the biasing member (see FIG. 2A) supported between the frame 120 and the caster fork 140, the vertical distance h, between the connector pin 170 and the wheel axle 30 becomes shorter. This variance in the h, between the connector pin 170 and the wheel axle 30 over the travel range of the caster fork 140 corresponds to the travel range for the base 34 of the wheel 14.

While certain embodiments have been described, these embodiments have been presented by way of example only and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Certain terminology may be used in the following description for the purpose of reference only, and thus is not intended to be limiting. For example, terms such as "upper", "lower", "upward", "downward", "above", "below", "top", "bottom", "left", and similar terms refer to directions in the drawings to which reference is made. Such terminology may include the words specifically mentioned above, derivatives thereof, and words of similar import. Similarly, the terms "first", "second", and other such numerical terms referring to structures neither imply a sequence or order unless clearly indicated by the context.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "spherical" or "circular" or "cylindrical" or "semi-circular" or "semi-cylindrical" or any related or similar terms, are not required to conform strictly to the mathematical definitions of spheres, circles, cylinders or other structures, but can encompass structures that are reasonably close approximations.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees. As another example, in certain embodiments, as the context may permit, the term "generally perpendicular" can refer to something that departs from exactly perpendicular by less than or equal to 20 degrees.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Some embodiments have been described in connection with the accompanying drawings. The figures are drawn to scale, but such scale is not limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although the invention has been disclosed in the context of certain embodiments and examples, it will be understood by those skilled in the art that this disclosure extends beyond the specifically disclosed embodiments to other alternative embodiments and/or uses of the embodiments and certain modifications and equivalents thereof. The scope of the present disclosure is not intended to be limited by the specific disclosures of preferred embodiments in this section or elsewhere in this specification, but should be determined only by a fair reading of the claims.

What is claimed is:

1. A caster assembly, comprising:
a caster fork comprising first and second caster fork arms extending from either side of a central fork portion, the first and second caster fork arms configured to support a wheel disposed therebetween;
a conical coil spring connected at a first end to the central fork portion of the caster fork; and
a caster frame, the caster frame comprising a central frame portion and first and second frame wing portions extending from either side of the central frame portion, the caster fork attached to the caster frame and pivotable about an axis of rotation relative to the caster frame,
the first and second frame wing portions located laterally outward of the caster fork arms,
the central frame portion comprising a recessed section including a mounting surface oriented at an oblique angle with respect to the central frame portion, the conical coil member connected at a second end to the mounting surface in the recessed section of the central frame portion, the conical coil spring configured to bias the central fork portion away from the central frame portion, a depth of the recessed frame portion being greater than a height of the conical coil spring in a compressed state, such that the recessed section of the central frame portion providing clearance for the conical coil spring to collapse within the recessed section of the central frame portion when the central frame portion is moved towards the central fork portion.

2. The caster assembly of claim 1, wherein the conical coiled spring tapers from a larger cross-sectional diameter at the second end to a smaller cross-sectional diameter at the first end.

3. The caster assembly of claim 1, wherein the central fork portion is substantially planar, and wherein the first and second fork arms extend generally parallel to one another in a direction generally orthogonal to the plane of the central fork portion.

4. The caster assembly of claim 1, wherein the central frame portion can be brought into contact with the central fork portion when the conical coil spring is in a compressed state.

5. The caster assembly of claim 1, wherein the caster frame is coupled to a thrust bearing, and wherein the caster frame is rotatable about a bearing axis of rotation of the thrust bearing.

6. The caster assembly of claim 5, wherein an axis of rotation of the thrust bearing is substantially perpendicular to the axis of rotation of the caster fork.

7. The caster assembly of claim 5, wherein the caster fork is configured to support a wheel having an axis of rotation which remains radially offset from an axis of rotation of the thrust bearing.

8. The caster assembly of claim 5, wherein the caster fork is attached to the caster frame by at least one connector pin, the at least one connector pin located between the thrust bearing and the conical coil spring.

9. The caster assembly of claim 1, wherein the caster fork comprises a plurality of mounting apertures configured to support a wheel assembly.

10. The caster assembly of claim 9, wherein a distance between a plane of the central frame portion and the mounting apertures in a direction normal to the plane of the central frame portion increases with rotation of the central fork portion away from the central frame portion.

11. The caster assembly of claim 9, wherein the conical coil spring is configured to push the caster fork away from the central frame portion to maintain contact between an underlying surface and a wheel supported by the caster fork.

12. A wheeled apparatus, comprising:
an apparatus frame; and
a plurality of wheels supported by the apparatus frame, at least one of the wheels supported by the caster assembly of claim 1.

13. The wheeled apparatus of claim 12, wherein the wheeled apparatus comprises a shopping cart.

14. The wheeled apparatus of claim 12, wherein the entire caster fork is located between a front edge and a rear edge of the wheel.

* * * * *